United States Patent
Sarkar et al.

(10) Patent No.: US 9,483,298 B2
(45) Date of Patent: Nov. 1, 2016

(54) CONVERTING VIRTUAL MACHINE I/O REQUESTS

(71) Applicant: VMWARE, INC., Palo Alto, CA (US)

(72) Inventors: Prasenjit Sarkar, Bangalore (IN); Vineet Kumar Sinha, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 190 days.

(21) Appl. No.: 14/295,363

(22) Filed: Jun. 4, 2014

(65) Prior Publication Data

US 2015/0309827 A1    Oct. 29, 2015

(30) Foreign Application Priority Data

Apr. 23, 2014   (IN) .............................. 2081/CHE/2014

(51) Int. Cl.
G06F 9/455       (2006.01)
G06F 11/14       (2006.01)

(52) U.S. Cl.
CPC ....... *G06F 9/45558* (2013.01); *G06F 9/45533* (2013.01); *G06F 9/45545* (2013.01); *G06F 11/1484* (2013.01); *G06F 2009/4557* (2013.01); *G06F 2009/45579* (2013.01); *G06F 2201/815* (2013.01)

(58) Field of Classification Search
CPC ...................... G06F 9/45558; G06F 209/4557; G06F 2009/45579; G06F 2009/45533; G06F 2009/45595; G06F 9/45545; G06F 2201/815; G06F 11/1484
See application file for complete search history.

(56) References Cited

U.S. PATENT DOCUMENTS

| | | | | |
|---|---|---|---|---|
| 2008/0082777 | A1* | 4/2008 | Sakaguchi | G06F 3/0605 711/170 |
| 2008/0104591 | A1* | 5/2008 | McCrory | G06F 9/45558 718/1 |
| 2011/0179417 | A1* | 7/2011 | Inakoshi | G06F 9/45558 718/1 |
| 2013/0204963 | A1* | 8/2013 | Boss | G06F 3/0604 709/217 |
| 2013/0297922 | A1* | 11/2013 | Friedman | G06F 8/63 713/2 |
| 2014/0013322 | A1* | 1/2014 | Freimuth | G06F 8/63 718/1 |

OTHER PUBLICATIONS

Saba Sehrish et al., Improving Collective I/O Performance by Pipelining Request Aggregation and File Access, ACM, 2013, retrieved online on Jul. 7, 2016, pp. 37-42. Retrieved from the (Continued)

*Primary Examiner* — Thuy Dao
*Assistant Examiner* — Hanh T Bui

(57) ABSTRACT

Systems, computer readable mediums, and techniques are described for converting virtual machine input/output (I/O) requests. One of the techniques includes obtaining access request data for one or more virtual machines (VMs) executing on a physical machine, wherein the access request data characterizes data access requests received from the one or more VMs; classifying, using the access request data, each of the one or more VMs as having either a sequential data access pattern or a random data access pattern;receiving a first I/O request packet from a first VM of the one or more VMs; determining that the first VM has been classified as having a random data access pattern; andsplitting the first I/O request packet into a plurality of second I/O request packets based at least in part on determining that the first VM has been classified as having a random data access pattern.

14 Claims, 3 Drawing Sheets

(56) References Cited

OTHER PUBLICATIONS

Internet: <URL: http://delivery.acm.org/10.1145/2490000/2488559/p37-sehrish.pdf?>.* Xiao Ling et al., Cluster Scheduler on Heterogeneous Cloud, IEEE, 2015, retrieved online on Jul. 7, 2016, pp. 772-777. Retrieved from the Internet<URL: http://ieeexplore.ieee.org/stamp/stamp.jsp?tp=&arnumber=7336251>.*

* cited by examiner

CONVERTING VIRTUAL MACHINE I/O REQUESTS

RELATED APPLICATIONS

Benefit is claimed under 35 U.S.C. 119(a)-(d) to Foreign application Serial No. 2081/CHE/2014 filed in India entitled "CONVERTING VIRTUAL MACHINE I/O REQUESTS", filed on Apr. 23, 2014, by VMware, Inc., which is herein incorporated in its entirety by reference for all purposes.

BACKGROUND

This document relates to converting input/output (I/O) requests from virtual machines.

A virtual machine (VM) is a software-based abstraction of a physical computer system. A VM is executed on a physical computer through the use of virtualization software typically referred to as a "hypervisor." A physical computer system, referred to herein as a host machine, can execute one or more VMs. The hypervisor is software that is logically interposed between and interfaces with a VM and a physical computer system. In general, each VM is configured to execute an operating system, referred to herein as a guest OS, and applications.

Some applications executing on VMs may be configured to request to access data randomly rather than sequentially.

BRIEF DESCRIPTION OF THE DRAWINGS

Like reference numbers and designations in the various drawings indicate like elements.

DETAILED DESCRIPTION

Particular embodiments of the subject matter described in this document can be implemented so as to realize one or more of the following advantages. By splitting I/O requests received from VMs that have been classified as having a random data access pattern into multiple I/O requests, efficiency losses due to the random data access pattern can be mitigated. That is, I/O requests received from VMs having a random data access pattern can be processed more efficiently. Single-threaded VMs with a random data access pattern can be converted to send and request data like multi-threaded applications, improving the performance of the physical machine on which the VMs execute.

Figure 1:
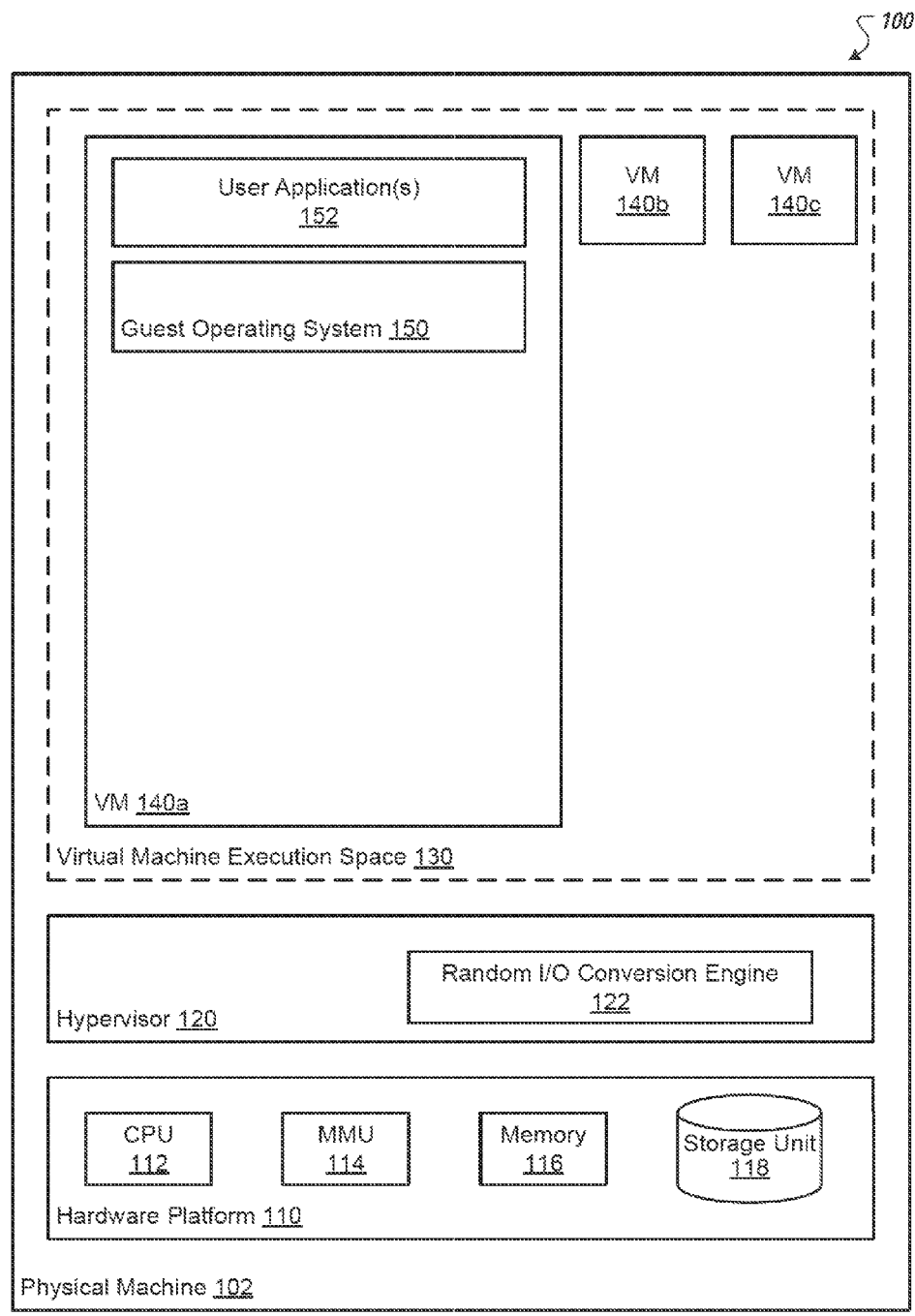
FIG. 1 shows an architecture for an example system that is configured to manage the execution of VMs.

FIG. 1 shows an architecture for an example system 100 that is configured to manage the execution of virtual machines (VMs). In the system 100, a physical machine 102 is configured to execute VMs 140a-140c using a hypervisor 120. The physical machine 102 is one or more data processing apparatus that each includes a hardware platform 110. The hardware platform 110 may include, for example, a processor (CPU) 112, a memory management unit (MMU) 114, memory 116 (e.g. Random Access Memory (RAM)), a storage unit 118, a network adapter, and so on.

The hypervisor 120 is a virtualization software layer that executes on the hardware platform 110. The hypervisor 120 manages a virtual machine execution space 130 within which one or more VMS 140a-140c may be concurrently instantiated and executed. Although three VMs 140a-140c are illustrated in FIG. 1, the hypervisor 120 can manage other numbers of VMs. For each VM 140a-140c, the hypervisor 120 manages a corresponding virtual hardware platform. Each virtual hardware platform includes emulated hardware, e.g., a virtual storage device, a virtual network adapter/interface, virtual memory, a virtual processor, and so on.

Each VM 140a-140c managed by the hypervisor 120 executes a guest operating system, e.g., guest OS 150, that executes user applications, e.g., user applications 152. The hypervisor 120 transforms input/output (I/O) requests from the guest OS 150 and from the user applications 152 to the corresponding virtual hardware platform into corresponding requests to the hardware platform 110. The hypervisor 120 can be configured to manage VMs having different types of operating systems. For example, the hypervisor 120 may be configured to concurrently manage VMs executing a Windows OS and VMs executing a Linux OS.

The requests transformed by the hypervisor 120 can include requests by the guest OS or by user applications to access and store data in memory 116 and/or the local storage unit 118. For example, when a user application 152 stores data in virtual memory, the virtualization layer 120 can store the data in the memory 116 of the hardware platform, for example, based on a mapping of virtual memory to hardware memory. For example, the mapping may map addresses for virtual blocks to address of corresponding physical blocks, e.g., to logical block addresses for the physical blocks. Some user applications may be configured to access data from the memory 116 or the local storage unit 118 in a random pattern, while other user applications may be configured to access data sequentially. An application executing on a VM that is configured to access data sequentially accesses stored data in a pre-determined sequence that accounts for the relative location of the blocks being accessed, e.g., so that, after the data access request is received by the hypervisor 120 and transformed into a request to store or access data from physical storage, blocks of data that are stored closer to each other in the physical storage are closer in the sequence than blocks of data that are stored farther from each other. An application executing on a VM that is configured to access data randomly accesses data without regard for the relative locations of the blocks in the physical storage, e.g., so that the determination of which block of data to access is not based on the location of a previously-accessed block.

In some implementations, the hypervisor 120 includes a random I/O conversion engine 122. The random I/O conversion engine determines which of the VMs 140a-140c that are being managed by the hypervisor 120 are accessing data sequentially and which VMs 140a-140c are accessing data randomly. If the random I/O conversion engine 122 determines that a VM is accessing data randomly, the random I/O conversion engine 122 can convert individual I/O requests received from the VM into multiple I/O requests before they are processed by the hardware platform 110, as described in more detail below with reference to FIGS. 2 and 3. By converting single I/O requests received from VMs that are accessing data randomly into multiple I/O requests, the random I/O conversion engine 122 can mitigate negative performance effects caused by the random data access pattern of the VM and improve performance of the physical machine 102.

In some other implementations, the random I/O conversion engine 120 can be implemented on a different physical machine from the physical machine 102 or in one or more other virtual machines executing on the physical machine 102. For example, the random I/O conversion engine 120 can be implemented in one or more appliance VMs executing on the physical machine 102 or on a different physical machine. In these implementations, each of the VMs being monitored by the appliance VM or the hypervisor monitoring the VMs sends data identifying I/O requests to the appliance VM. As will be described below, in yet other implementations, a portion of the functionality of the random I/O conversion engine 120 can be implemented in the hypervisor 120, while other portions of the functionality of the random I/O conversion engine 120 can be implemented on another virtual machine executing on the physical machine 102 or on a different physical machine.

Figure 2:
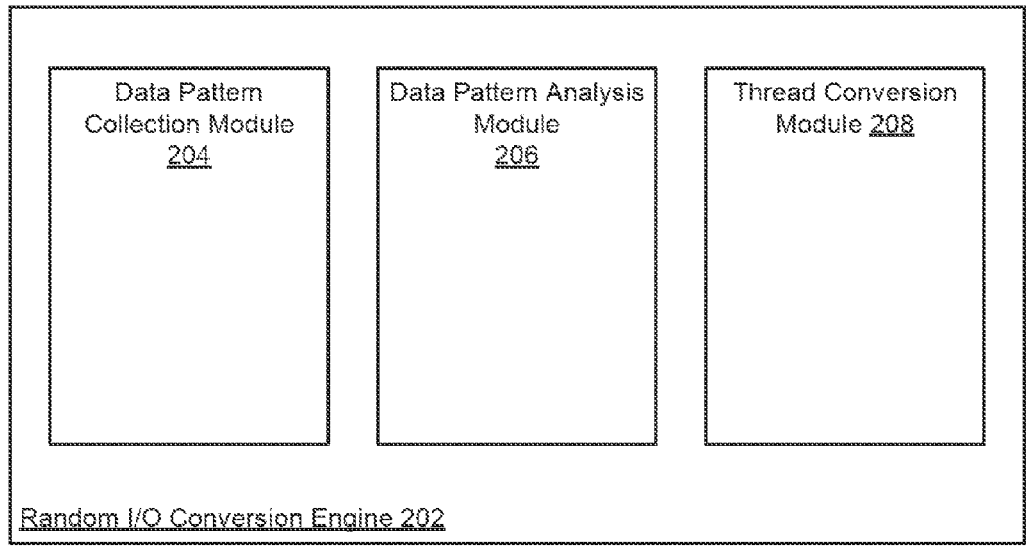
FIG. 2 shows an architecture for an example random I/O conversion engine.

FIG. 2 shows an architecture for an example random I/O conversion engine 202. The conversion engine 202 includes a data pattern collection module 204, a data pattern analysis module 206, and a thread conversion module 208.

Although this diagram depicts the data pattern collection module 204, data pattern analysis module 206, and thread conversion module 208 as logically separate, such depiction is merely for illustrative purposes. The objects/processes portrayed in this figure can be arbitrarily combined or divided into separate components. Furthermore, such objects/processes, regardless of how they are combined or divided, can execute on the same data processing apparatus or can be distributed among different data processing apparatus connected by one or more networks. For example, in some implementations, the conversion engine 202 executes in a hypervisor of a physical machine that is configured to monitor the execution of one or more VMs on the physical machine, e.g., the hypervisor 120 of the physical machine 102 of FIG. 1. In some other implementations, the conversion engine 202 executes on a different physical machine or as part of a different virtual machine on the same physical machine as the hypervisor and the VMs being monitored by the hypervisor. In yet other implementations, the data pattern collection module 204, the data pattern analysis module 206, and the thread conversion module 208 can be distributed among different virtual machines, different physical machines, or both. For example, the data pattern collection module 204 and the data pattern analysis module 206 can execute as part of an appliance VM executing on the same physical machine as the hypervisor or on a different physical machine from the hypervisor while the thread conversion module 208 executes in the hypervisor.

The data pattern collection module 204 identifies and stores data relating to data access requests received by the hypervisor from VMs being monitored by the hypervisor. Data access requests are requests by applications or other processes executing on the VM to access data from particular storage locations, e.g., from a particular block in a local or shared data storage unit. For each data access request received by the hypervisor, the data pattern collection module 204 can store data identifying the request, the VM from which the request originated, and the address, i.e., the logical block address, of the particular physical block requested to be accessed by the request. The data pattern collection module 204 also computes and stores the seek distances between successive requests received from a given VM. The seek distance between two successive data access requests received by the hypervisor from a given VM and transformed into requests to access data from particular physical storage locations can be measured as the difference between the logical block address of the block requested by the first request and the logical block address of the block requested by the second request.

The data pattern analysis module 206 uses the data generated by the data pattern collection module 204 to determine, for each of the VMs monitored by the hypervisor, whether the VM is accessing data in a random or sequential data access pattern. In particular, the data pattern analysis module 206 determines, for a given VM being monitored by the hypervisor, whether the VM is accessing data in a random or sequential pattern using the seek distances stored by the data pattern collection module 204 for the data access requests received from that VM. For example, the data pattern analysis module 206 may classify each VM for which the average of the absolute value of the seek distances exceeds a threshold value as accessing data in a random pattern. As another example, the data pattern analysis module 206 may classify each VM for which the ratio of seek distances that have an absolute value that exceeds a threshold value to total seek distances exceeds a threshold ratio as accessing data in a random pattern. As yet another example, the data pattern analysis module 206 may classify each VM for which the variance or standard deviation among the computed seek distance exceeds a threshold value as accessing data in a random pattern.

Once the VMs being monitored by the hypervisor have been classified as having either a random data access pattern or a sequential data access pattern, the thread conversion module 208 receives I/O requests from the VMs being monitored by the hypervisor and determines whether the requests meet criteria for being converted into multiple requests. If an I/O request meets the criteria, the thread conversion module 208 splits the request into multiple requests before providing the multiple requests for execution by the physical hardware platform of the physical machine, i.e., instead of the original received I/O request. Splitting an I/O request packet into multiple I/O request packets is described in more detail below with reference to FIG. 3.

Figure 3:
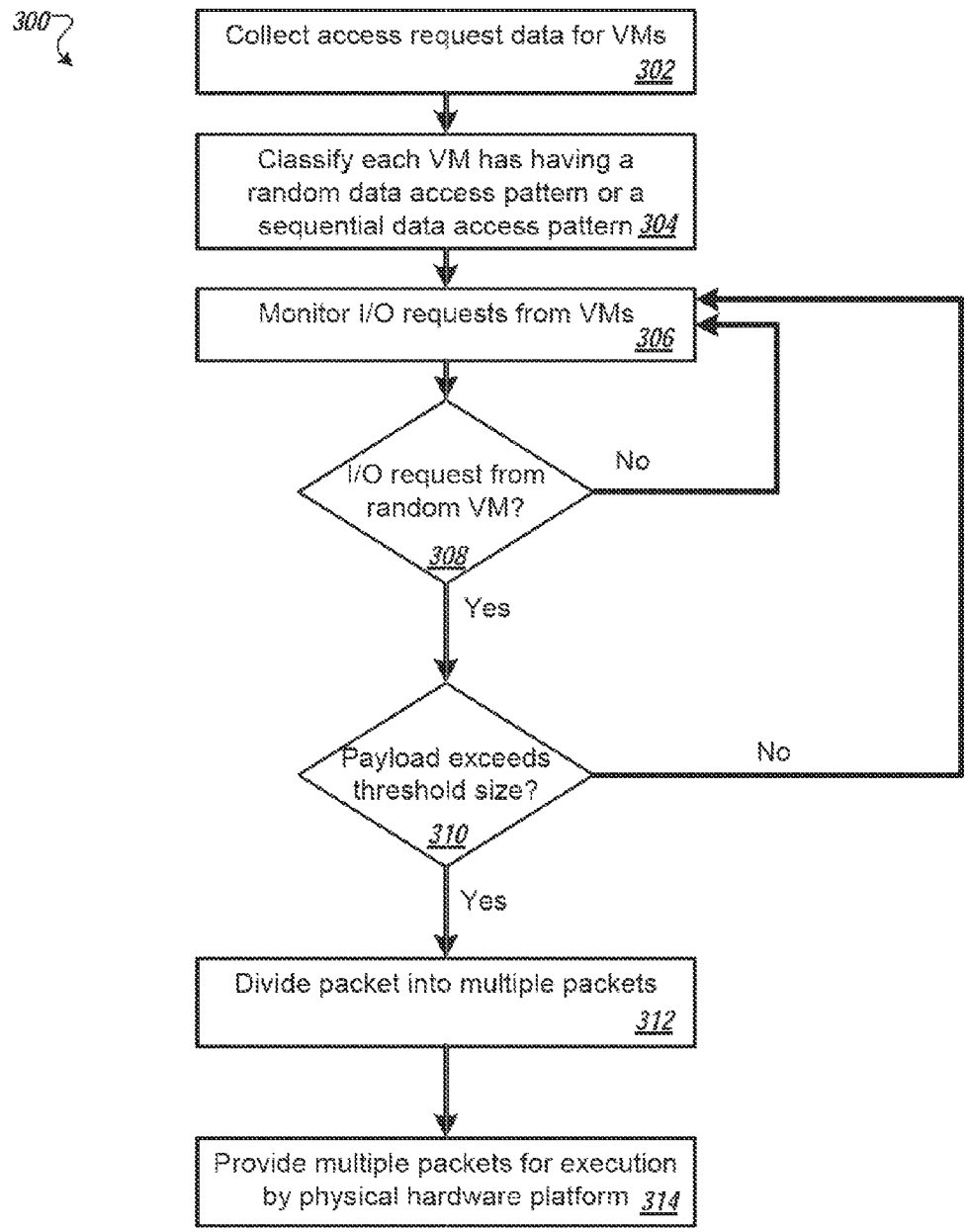
FIG. 3 shows a flow diagram of an example technique for converting I/O requests received from VMs.

FIG. 3 shows a flow chart of an example technique 300 for converting I/O requests. The example technique 300 is performed by a system of one or more computers. For example, the technique 300 may be performed by a physical machine configured to execute one or more virtual machines, e.g., the physical machine 102 of FIG. 1.

The system collects access request data for VMs being monitored by the system (step 302). In some implementations, a random I/O conversion engine executing in a hypervisor, e.g., the random I/O conversion engine 122 executing in the hypervisor 120 of FIG. 1, receives data access requests from VMs being monitored by the hypervisor and collects data relating to the access requests.

The system classifies each VM being monitored by the system as having a random data access pattern or a sequential data access pattern from the collected request data for the VMs (step 304). In particular, the system classifies each VM based on the seek distances for data access requests received from the VM. For example, the system can classify each VM having an average seek distance that exceeds a threshold as having a random data access pattern and each VM with an average seek distance that is equal to or below the threshold as having a sequential data access pattern.

The system monitors I/O requests from the VMs (step 306).

When an I/O request packet is received, the system determines whether the I/O request packet is from a VM that has been classified as having a random data access pattern (step 308).

If the request is not from a VM that has been classified as having a random data access pattern, the system does not modify the request and continues to monitor for I/O request packets (step 306).

If the request packet is from a VM that has been classified as having a random data access pattern, the system determines whether the payload of the I/O request packet exceeds a threshold size (step 310). The threshold size can be, for example, 4 kilo-bytes (KB), 6 KB, or 8 KB.

If the payload does not exceed the threshold size, the system does not modify the request and continues to monitor for I/O requests (step 306).

If the payload exceeds the threshold size, the system splits the I/O packet into multiple packets (step 312). That is, the system splits the I/O packet into multiple packets by copying the data of the I/O packet into a specified number of new packets. For example, the system can split the packet into multiple packets that have the specified threshold size. For example, if the threshold size is 4 KB and the received I/O packet has a 256 KB payload, the system can split the packet into 64 packets that each has a payload of 4 KB. As another example, if the threshold size is 8 KB and the received I/O packet has a 256 KB payload, the system can split the packet into 32 packets that each has a payload of 8 KB. In order to split the packet into the specified number of packets, the system can multiplex the payload of the I/O packet into the specified number of portions and use each of the portions as the payload of a different one of the new I/O packets. Thus, each new I/O packet will have a payload that is a portion of the payload of the original I/O packet but is otherwise identical to the original I/O packet.

The system provides the multiple I/O packets for execution by a physical hardware platform instead of providing the original I/O packet (step 314). That is, the system does not provide the original I/O packet for execution, but instead provides the multiple I/O packets for execution by the physical hardware platform.

When responses to the multiple I/O packets are received by the system from the physical hardware platform, the system can combine the response to each of the multiple I/O packets and provide the combined response to the VM as the response to the original I/O packet. For example, if the I/O packet request is a request to store data in memory, the system can receive a response to each of the multiple I/O packets indicating that the payload data for the I/O has been stored and provide a single response to the VM indicating that the requested data has been stored in memory.

The above description generally describes classifying VMs as having either a random or a sequential data access pattern and then, when an I/O packet is received from a VM that has been classified as having a random data access pattern, splitting the I/O packet into multiple I/O packets if the packet meets certain criteria. However, in some implementations, similar techniques can be used to classify individual applications executing on a VM as having either a random or sequential data access pattern and, once an application has been classified as having a random access pattern, splitting I/O packets received from the application into a multiple packets. That is, in some cases, two applications executing on the same VM may have different access patterns, with one accessing data sequentially and one accessing data randomly. To account for these cases, the technique 300 can be performed to determine whether each application executing on a VM has a random or sequential data access pattern by collecting access request data for each application executing on the VM and then classifying each application as having either a random or sequential data access pattern. When an I/O packet is received from an application that has been classified as having a random access pattern, the system can determine whether to split the packet into multiple I/O packets as described above.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining access request data for one or more virtual machines (VMs) executing on a physical machine, wherein the access request data characterizes data access requests received from the one or more VMs, and wherein the access request data comprises data identifying seek distances between successive data access requests;
   classifying, using the access request data, each of the one or more VMs as having either a sequential data access pattern or a random data access pattern, wherein classifying each of the one or more VMs comprises classifying each of the one or more VMs based on the seek distances between successive data access requests received from the VM;

receiving a first input/output (I/O) request packet from a first VM of the one or more VMs;

determining that the first VM has been classified as having a random data access pattern;

splitting the first I/O request packet into a plurality of second I/O request packets based at least in part on determining that the first VM has been classified as having a random data access pattern;

receiving a respective response to each second I/O request packet of the plurality of second I/O request packets;

combining the respective responses to generate a combined response; and providing the combined response to the first VM as a response to the first I/O request packet.

2. The method of claim 1, further comprising:
providing the plurality of second I/O request packets for execution instead of the first request I/O packet.

3. The method of claim 1, wherein splitting the first I/O request packet further comprises:
determining that a payload for the first I/O request packet exceeds a threshold size; and
splitting the first I/O request packet into the plurality of second I/O request packets based at least in part on determining that the payload for the first I/O request packet exceeds the threshold size.

4. The method of claim 3, further comprising:
receiving a third I/O request packet from the first VM;
determining that a payload of the third I/O request packet does not exceed the threshold size; and
determining not to split the third I/O request packet into multiple packets based at least in part on determining that the payload of the third I/O request packet does not exceed the threshold size.

5. The method of claim 1, further comprising:
receiving a fourth I/O request packet from a second VM of the one or more VMs;
determining that the second VM has been classified as having a sequential data access pattern; and
determining not to split the fourth I/O request packet into multiple packets based at least in part on determining that the second VM has been classified as having a sequential data access pattern.

6. The method of claim 1, wherein splitting the first I/O request packet into a plurality of second I/O request packets comprises:
multiplexing a payload of the first I/O request packet into a plurality of payloads; and
inserting each of the plurality of payloads as a payload of a respective second I/O request packet.

7. A system comprising one or more data processing apparatus and one or more storage devices storing instructions that, when executed by the one or more data processing apparatus, cause the one or more data processing apparatus to perform operations comprising:
obtaining access request data for one or more virtual machines (VMs) executing on a physical machine, wherein the access request data characterizes data access requests received from the one or more VMs, and wherein the access request data comprises data identifying seek distances between successive data access request;
classifying, using the access request data, each of the one or more VMs as having either a sequential data access pattern or a random data access pattern, wherein classifying each of the one or more VMs comprise classifying each of the one or more VMs based on the seek distances between successive data access requests received from the VM;

receiving a first input/output (I/O) request packet from a first VM of the one or more VMs;

determining that the first VM has been classified as having a random data access pattern;

splitting the first I/O request packet into a plurality of second I/O request packets based at least in part on determining that the first VM has been classified as having a random data access pattern;

receiving a respective response to each second I/O request packet of the plurality of second I/O request packets;

combining the respective responses to generate a combined response; and providing the combined response to the first VM as a response to the first I/O request packet.

8. The system of claim 7, the operations further comprising:
providing the plurality of second I/O request packets for execution instead of the first request I/O packet.

9. The method of claim 7, wherein splitting the first I/O request packet further comprises:
determining that a payload for the first I/O request packet exceeds a threshold size; and
splitting the first I/O request packet into the plurality of second I/O request packets based at least in part on determining that the payload for the first I/O request packet exceeds the threshold size.

10. The system of claim 7, wherein splitting the first I/O request packet into a plurality of second I/O request packets comprises:
multiplexing a payload of the first I/O request packet into a plurality of payloads; and
inserting each of the plurality of payloads as a payload of a respective second I/O request packet.

11. A non-transitory computer storage medium encoded with a computer program, the program comprising instructions that when executed by one or more data processing apparatus cause the one or more data processing apparatus to perform operations comprising:
obtaining access request data for one or more virtual machines (VMs) executing on a physical machine, wherein the access request data characterizes data access requests received from the one or more VMs, and wherein the access request data comprises data identifying seek distances between successive data access requests;
classifying, using the access request data, each of the one or more VMs as having either a sequential data access pattern or a random data access pattern, wherein classifying each of the one or more VMs comprises classifying each of the one or more VMs based on the seek distances between successive data access requests received from the VM;

receiving a first input/output (I/O) request packet from a first VM of the one or more VMs;

determining that the first VM has been classified as having a random data access pattern;

splitting the first I/O request packet into a plurality of second I/O request packets based at least in part on determining that the first VM has been classified as having a random data access pattern;

receiving a respective response to each second I/O request of the plurality of second I/O request packets;

combining the respective responses to generate a combined response; and providing the combined response to the first VM as a response to the first I/O request packet.

12. The non-transitory computer storage medium of claim 11, the operations further comprising:

providing the plurality of second I/O request packets for execution instead of the first request I/O packet.

13. The non-transitory computer storage medium of claim 11, wherein splitting the first I/O request packet further comprises:

determining that a payload for the first I/O request packet exceeds a threshold size; and splitting the first I/O request packet into the plurality of second I/O request packets based at least in part on determining that the payload for the first I/O request packet exceeds the threshold size.

14. The non-transitory computer storage medium of claim 11, wherein splitting the first I/O request packet into a plurality of second I/O request packets comprises:

multiplexing a payload of the first I/O request packet into a plurality of payloads; and inserting each of the plurality of payloads as a payload of a respective second I/O request packet.

* * * * *